US012439900B1

(12) United States Patent
Negre et al.

(10) Patent No.: US 12,439,900 B1
(45) Date of Patent: Oct. 14, 2025

(54) BAITFISH RIGGING DEVICE

(71) Applicants: Villy Negre, Waianae, HI (US); Francis Kealoha, Waianae, HI (US)

(72) Inventors: Villy Negre, Waianae, HI (US); Francis Kealoha, Waianae, HI (US)

( * ) Notice: Subject to any disclaimer, the term of this patent is extended or adjusted under 35 U.S.C. 154(b) by 0 days.

(21) Appl. No.: 18/738,223

(22) Filed: Jun. 10, 2024

Related U.S. Application Data

(60) Provisional application No. 63/632,172, filed on Apr. 10, 2024.

(51) Int. Cl.
*A01K 83/06* (2006.01)

(52) U.S. Cl.
CPC ............ *A01K 83/06* (2013.01); *A01K 83/064* (2022.02)

(58) Field of Classification Search
CPC ........ A01K 83/00; A01K 83/04; A01K 83/06; A01K 83/064
See application file for complete search history.

(56) References Cited

U.S. PATENT DOCUMENTS

| | | | | | |
|---|---|---|---|---|---|
| 580,915 | A | * | 4/1897 | Welch | A01K 83/06 43/44.2 |
| 1,246,150 | A | * | 11/1917 | Parr | A01K 83/06 43/44.4 |
| 1,325,530 | A | * | 12/1919 | Ore | A01K 83/00 43/44.8 |
| 1,386,061 | A | * | 8/1921 | Johnson | A01K 83/06 43/44.4 |
| 1,461,246 | A | * | 7/1923 | Lent | F16B 45/028 43/44.2 |
| 1,863,544 | A | * | 6/1932 | Prouse | A01K 83/06 43/44.8 |
| 2,570,468 | A | * | 10/1951 | Matthes | A01K 83/00 43/44.8 |
| 2,573,018 | A | * | 10/1951 | Herrick | A01K 83/06 43/44.8 |
| 2,710,481 | A | * | 6/1955 | Matthes | A01K 83/00 43/44.8 |
| 2,755,593 | A | * | 7/1956 | Thurman | A01K 83/06 43/44.2 |
| 2,756,536 | A | * | 7/1956 | Orby | A01K 83/06 43/44.8 |
| 2,795,074 | A | * | 6/1957 | Loomis | A01K 83/00 43/37 |
| 2,825,174 | A | * | 3/1958 | Leinonen | A01K 83/06 43/44.8 |

(Continued)

*Primary Examiner* — Richard G Davis
(74) *Attorney, Agent, or Firm* — Brennan, Manna & Diamond, LLC

(57) ABSTRACT

A baitfish rigging device is provided. The device is comprised of a combination bridle and rigging needle for attaching live baitfish to a fishing line. The device features an open loop latch with a bridle needle at one end for piercing the baitfish, which is secured in an oblong-shaped bridle cavity loop. The loop is designed to close securely after passing through the baitfish, preventing disengagement. The device also includes a fishing hook, which may be attached to the loop via an interlocking link or a barb that grips the loop to prevent separation. Additionally, parts of the device may be encased in protective materials like polyolefin heat shrink tubing or reinforced epoxy resin to shield against corrosion and damage from toothy game fish.

16 Claims, 3 Drawing Sheets

(56) References Cited

U.S. PATENT DOCUMENTS

| | | | | |
|---|---|---|---|---|
| 2,871,611 A | * | 2/1959 | Shepard, Jr. | A01K 83/06 43/44.2 |
| 2,900,754 A | * | 8/1959 | Orlik | A01K 83/06 43/44.2 |
| 2,927,393 A | * | 3/1960 | Flamisch | A01K 83/06 43/44.2 |
| 3,047,977 A | * | 8/1962 | Der-Hagopian | A01K 83/06 43/44.8 |
| 3,105,319 A | * | 10/1963 | Whalen | A01K 83/06 43/44.4 |
| 3,744,179 A | * | 7/1973 | Smith | A01K 83/06 43/44.4 |
| 4,719,717 A | * | 1/1988 | Koestner | A01K 83/06 43/44.8 |
| 4,989,361 A | * | 2/1991 | Peterson | A01K 83/06 43/44.2 |
| 5,377,442 A | | 1/1995 | Gariglio | |
| 5,386,661 A | * | 2/1995 | Davis | A01K 83/06 43/44.8 |
| 5,680,726 A | * | 10/1997 | Sassone | A01K 83/00 43/43.16 |
| 6,141,900 A | * | 11/2000 | Rudolph | A01K 85/00 43/42.31 |
| 6,219,956 B1 | * | 4/2001 | Hurt | A01K 83/06 43/44.4 |
| 6,993,866 B1 | | 2/2006 | Strange | |
| 7,353,633 B1 | * | 4/2008 | Lane | A01K 83/00 43/37 |
| 9,485,973 B2 | | 11/2016 | Burke | |
| 2002/0124456 A1 | * | 9/2002 | Mendoza | A01K 83/00 43/44.82 |
| 2005/0044772 A1 | * | 3/2005 | Lillard, II | A01K 83/06 43/44.6 |
| 2006/0005459 A1 | * | 1/2006 | Lehman | A01K 83/06 43/42.15 |
| 2006/0143973 A1 | * | 7/2006 | Corbitt | A01K 83/06 43/44.8 |
| 2010/0005704 A1 | * | 1/2010 | Siatkowski | A01K 83/06 43/44.8 |
| 2014/0013647 A1 | | 1/2014 | Burke | |
| 2014/0215895 A1 | * | 8/2014 | Zobrosky | A01K 83/06 43/44.8 |
| 2017/0325433 A1 | * | 11/2017 | Frederick | A01K 83/02 |
| 2020/0128803 A1 | | 4/2020 | Nahvi | |

* cited by examiner

BAITFISH RIGGING DEVICE

CROSS-REFERENCE TO RELATED APPLICATION

The present application claims priority to, and the benefit of, U.S. Provisional Application No. 63/632,172, which was filed on Apr. 10, 2024, and is incorporated herein by reference in its entirety.

FIELD OF THE INVENTION

The present invention relates generally to the field of fishing bait attachment devices. More specifically, the present invention relates to a baitfish rigging device that combines a bridle and a rigging needle in a singular device. Accordingly, the present disclosure makes specific reference thereto. Nonetheless, it is to be appreciated that aspects of the present invention are also equally applicable to other like applications, devices, and methods of manufacture.

BACKGROUND

Attaching live bait to a fishing hook rig can be a challenging and time-consuming task that often leads to frustration. Live bait is essential for luring large, predatory fish, making the process critical for successful fishing. To effectively secure the bait, specialized equipment is necessary, including a separate bridle-like twine and a bait rigging needle. These tools are used to carefully thread the bridle through a strategically chosen point on the live baitfish, ensuring that it is well-secured yet remains lively enough to attract target fish.

Therefore, there exists a long-felt need in the art for an improved baitfish attaching system for fishing. There also exists a long-felt need in the art for a baitfish rigging device. Further, there exists a long-felt need in the art for a baitfish rigging device that allows a user to quickly and efficiently attach baitfish to a fishing line. More specifically, there exists a long-felt need in the art for a baitfish rigging device that combines a bridle and bait rigging needle.

The subject matter disclosed and claimed herein, in one embodiment thereof, comprises a baitfish rigging device. The device is comprised of a combination bridle and rigging needle for attaching live baitfish to a fishing line. The device features an open loop latch with a bridle needle at one end for piercing the baitfish, which is secured in an oblong-shaped bridle cavity loop. The loop is designed to close securely after passing through the baitfish, preventing disengagement. The device also includes a fishing hook, which may be attached to the loop via an interlocking link or a barb that grips the loop to prevent separation. Additionally, parts of the device may be encased in protective materials like polyolefin heat shrink tubing or reinforced epoxy resin to shield against corrosion and damage from toothy game fish.

In this manner, the baitfish rigging device of the present invention accomplishes all the foregoing objectives and provides an improved baitfish attaching system for fishing. During use, the device allows a user to quickly and efficiently attach baitfish to a fishing line. More specifically, the device does so by combining a bridle and bait rigging needle.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a baitfish rigging device that combines a bridle and rigging needle into a singular device for the quick attachment of live baitfish to a fishing line. The device is comprised of a bridle cavity loop with a first end comprised of an integral bridle needle that can penetrate the skin/body of a baitfish attached to the loop, which loops through the baitfish. The loop is held closed (to retain a baitfish) after being passed through a baitfish via at least one opening loop latch of the second end of the loop.

The device is also comprised of at least one hook, wherein the loop attaches to the hook. Any portion of the loop and/or hook may be covered with at least one protective casing. The casing provides corrosion resistance and protection against twisting and abrasion of the loop, hook, etc., by toothy game fish.

The present invention is also comprised of a method of using the device. First, a device is provided comprised of an open loop latch comprised of a bridle needle, a bridle cavity loop, and a hook. Then, an eyelet of a hook can be attached to a fishing line leader using a fishing knot and/or a mechanical crimp. Next, a user pushes the needle outside of the open loop latch. Next, the first end of the needle can be pushed through a body part of a baitfish such that the body of the fish is secured in the bridle cavity loop. Then, the user can push the needle back into/within the open loop latch such that the loop is closed and the baitfish remains securely attached to the device via the loop.

Accordingly, the baitfish rigging device of the present invention is particularly advantageous as it provides an improved baitfish attaching system for fishing. During use, the device allows a user to quickly and efficiently attach baitfish to a fishing line. More specifically, the device does so by combining a bridle and bait rigging needle. In this manner, the baitfish rigging device overcomes the limitations of existing devices and methods of attaching live bait known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
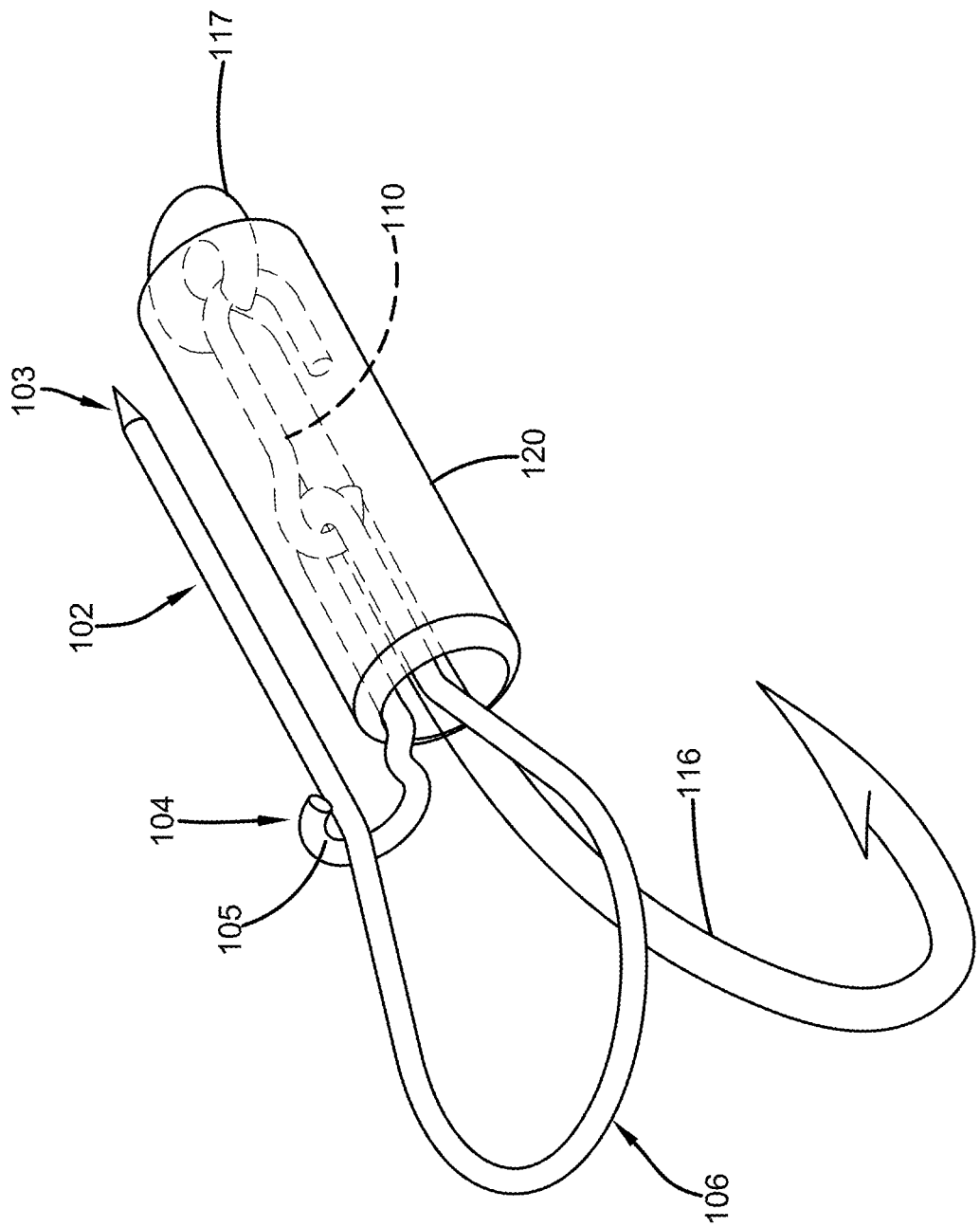
FIG. 1 illustrates a perspective view of one potential embodiment of a baitfish rigging device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved baitfish attaching system for fishing. There also exists a long-felt need in the art for a baitfish rigging device. Further, there exists a long-felt need in the art for a baitfish rigging device that allows a user to quickly and efficiently attach baitfish to a fishing line. More specifically, there exists a long-felt need in the art for a baitfish rigging device that combines a bridle and bait rigging needle.

The present invention, in one exemplary embodiment, is comprised of a baitfish rigging device. The device combines a bridle and rigging needle into a singular device for the quick attachment of live baitfish to a fishing line. The device is comprised of an open loop latch with a first end comprised of an integral bridle needle. During use, the needle can penetrate the skin/body of a baitfish attached to the bridle cavity loop of the device. The loop is placed through the baitfish and is held closed (to retain a baitfish) after being passed through the baitfish via at least one opening loop latch of the second end of the loop.

The device is also comprised of at least one hook. The loop attaches to the hook via various methods and structures in different embodiments. Any portion of the loop and/or hook may be covered with at least one protective casing. The casing provides corrosion resistance and protection against twisting and abrasion of the loop, hook, etc., by toothy game fish.

The present invention is also comprised of a method of using the device. First, a device is provided comprised of a bridle cavity loop comprised of a bridle needle, an open loop latch, and a hook. Then, an eyelet of a hook can be attached to a fishing line leader using a fishing knot and/or a mechanical crimp. Next, a user pushes the needle outside of the open loop latch. Next, the first end of the needle can be pushed through a body part of a baitfish such that the body of the fish is secured in the bridle cavity loop. Then, the user can push the needle back into/within the open loop latch such that the loop is closed and the baitfish remains securely attached to the device via the loop.

Accordingly, the baitfish rigging device of the present invention is particularly advantageous as it provides an improved baitfish attaching system for fishing. During use, the device allows a user to quickly and efficiently attach baitfish to a fishing line. More specifically, the device does so by combining a bridle and bait rigging needle. In this manner, the baitfish rigging device overcomes the limitations of existing devices and methods of attaching live bait known in the art.

Referring initially to the drawings, FIG. 1 illustrates a perspective view of one potential embodiment of a baitfish rigging device 100 of the present invention in accordance with the disclosed architecture. The device 100 combines a bridle and rigging needle into a singular device for the quick attachment of live baitfish to a fishing line. All components of the device 100 are preferably made from a marine-grade stainless steel. The device 100 is comprised of a bridle cavity loop 106. A first end 103 of the loop 106 is comprised of an integral bridle needle 102 that is preferably pointed such that it can penetrate the skin/body of a baitfish attached to the loop 106, which loops through the baitfish. The loop 106 has a generally oblong shape that provides an area to loop through and secure the baitfish. More specifically, the loop 106 is held closed (to retain a baitfish) after being passed through a baitfish via at least one opening loop latch 105 of the second end 104 of the loop 106. More specifically, the needle 102 and/or a portion of the loop 106 can be placed inside the latch 105 such that needle 102 cannot become open (i.e., unfastened) from the baitfish and wherein the baitfish could fall off of the needle 102 and/or loop 106.

Figure 2:
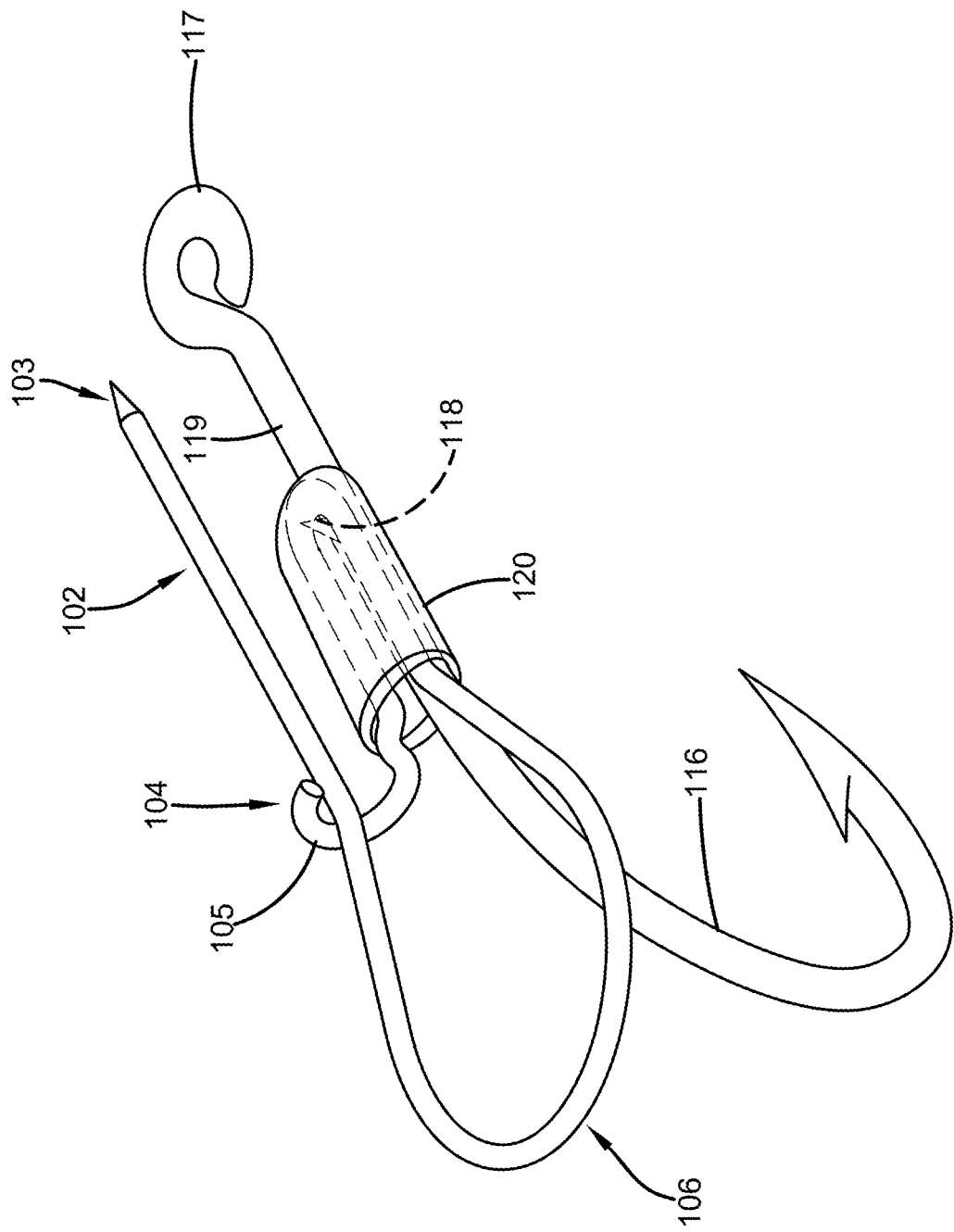
FIG. 2 illustrates a perspective view of one potential embodiment of a baitfish rigging device of the present invention in accordance with the disclosed architecture.

The device 100 is also comprised of at least one hook 116. The hook 116 may be any style and configuration of fishing hook known in the art. The loop 106 attaches to the hook 16. In one embodiment, the device 100 is comprised of at least one interlocking link 110 (of any shape and configuration), as seen in FIG. 1., that connects the loop 106 to an eyelet 117 of the hook 116. In a second embodiment, the hook 116 is comprised of a barb 118 (as seen in FIG. 2) that extends from the exterior surface 119 of the hook 116. The barb 118 is constructed such that it hooks the loop 106 and prevents the loop 106 from separating from the hook 116.

Any portion of the loop 106, link 110, and/or hook 116 may be covered with at least one protective casing 120. The casing 120 is preferably made from a semi-rigid, dual-walled polyolefin heat shrink tubing or a reinforced epoxy resin. However, the casing 120 may be made from any material. The casing 120 provides corrosion resistance and protection against twisting and abrasion of the loop 106, hook 116, etc., by toothy game fish.

It should be appreciated that the device 100 and all components may be any size and shape to accommodate any size and type of baitfish and game fish.

Figure 3:
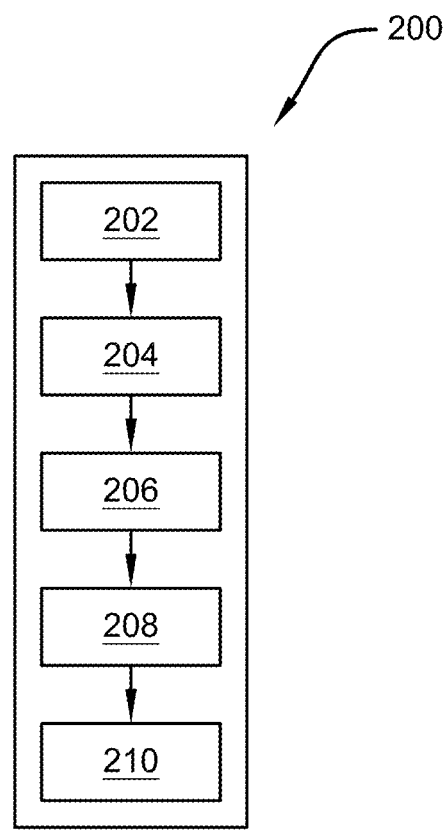
FIG. 3 illustrates a flowchart of a method of using one potential embodiment of a baitfish rigging device of the present invention in accordance with the disclosed architecture.

The present invention is also comprised of a method of using 200 the device 100, as seen in FIG. 3. First, a device is provided comprised of a bridle cavity loop 106 comprised of a bridle needle 102, an open loop latch 105, and a hook 116 [Step 202]. Then, an eyelet 117 of a hook 116 can be attached to a fishing line leader using a fishing knot and/or a mechanical crimp [Step 204]. Next, a user pushes the needle 102 outside of the open loop latch 105 [Step 206]. Next, the first end 103 of the needle 102 can be pushed through a body part of a baitfish such that the body of the fish is secured in the bridle cavity loop 106 [Step 208]. Then, the user can push the needle 102 back into/within the open loop latch 105 such that the loop 106 is closed and the baitfish remains securely attached to the device 100 via the loop [Step 210].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "baitfish rigging device" and "device" are interchangeable and refer to the baitfish rigging device 100 of the present invention.

Notwithstanding the foregoing, the baitfish rigging device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the baitfish rigging device 100 as shown in the FIGS. are for illustrative purposes only, and that many other sizes and shapes of the baitfish rigging device 100 are well within the scope of the present disclosure. Although the dimensions of the baitfish rigging device 100 are important design parameters for user convenience, the baitfish rigging device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A baitfish rigging device comprising:
    a bridle cavity loop comprised of a first end and a second end;
    an interlocking link;
    a hook comprised of an eyelet; and
    a protective casing, wherein the protective casing covers the interlocking link.

2. The baitfish rigging device of claim 1, wherein the bridle cavity loop is comprised of a marine grade stainless steel.

3. The baitfish rigging device of claim 1, wherein the interlocking link is comprised of a marine grade stainless steel.

4. The baitfish rigging device of claim 1, wherein the hook is comprised of a marine grade stainless steel.

5. The baitfish rigging device of claim 1, wherein the protective casing is comprised of a semi-rigid, dual-walled polyolefin heat shrink tubing or a reinforced epoxy resin.

6. The baitfish rigging device of claim 1, wherein the first end is comprised of a pointed end.

7. The baitfish rigging device of claim 1, wherein the second end is comprised of an open latch.

8. The baitfish rigging device of claim 1, wherein the bridle cavity loop is attached to the hook via the interlocking link.

9. The baitfish rigging device of claim 1, wherein the protective casing covers a portion of the hook.

10. A baitfish rigging device comprising:
    a bridle cavity loop comprised of a pointed first end and a second end comprised of an open loop latch;
    a hook comprised of an eyelet and a barb; and
    a protective casing, wherein the protective casing covers a portion of the hook.

11. The baitfish rigging device of claim 10, wherein the protective casing covers the barb.

12. The baitfish rigging device of claim 10 further comprising an interlocking link, wherein the bridle cavity loop, the interlocking link, and the hook are comprised of a marine grade stainless steel.

13. The baitfish rigging device of claim 10, wherein the protective casing is comprised of a semi-rigid, dual-walled polyolefin heat shrink tubing or a reinforced epoxy resin.

14. The baitfish rigging device of claim 10, wherein the bridle cavity loop is comprised of a marine grade stainless steel.

15. The baitfish rigging device of claim 10, wherein the interlocking link is comprised of a marine grade stainless steel.

16. The baitfish rigging device of claim 10, wherein the hook is comprised of a marine grade stainless steel.

\* \* \* \* \*